Sept. 30, 1958     A. J. MATTER     2,853,732

ADJUSTABLE SUPPORTING ROLLER WITH BRAKE

Filed Oct. 22, 1956

INVENTOR.
Albert J. Matter

United States Patent Office 2,853,732
Patented Sept. 30, 1958

2,853,732

ADJUSTABLE SUPPORTING ROLLER WITH BRAKE

Albert J. Matter, Park Ridge, Ill.

Application October 22, 1956, Serial No. 617,296

11 Claims. (Cl. 16—32)

In the case of appliances supported on rollers it is desirable that one or more rollers on each appliance be adjustable vertically both for leveling the appliance and for ensuring that each roller will rest solidly on the floor or other supporting surface.

It is also desirable to provide for locking at least one roller against rotation to prevent accidental shifting of an appliance after it has been adjusted into its position of final use.

An object of the present invention is to provide a simple, novel, inexpensive and reliable roller unit to meet the aforesaid requirements.

Also, where appliances are arranged in cabinets, it is desirable that adjustments in connection with rollers and brakes can be made from outside the cabinet.

A further object of the invention is to provide a roller unit which permits adjustments thereof to be made as easily as though the unit were on the outside of a cabinet, whenever such a unit is applied to an appliance housed in a cabinet.

A still further object of the invention is to provide a roller unit which can readily be so mounted within a cabinet that no change need be made in the latter except to provide small openings for the passage of a screw or screw driver.

The various features of novelty whereby the invention is characterized will hereinafter be pointed out in the claims; but, for a full understanding of the invention and its objects and advantages, reference may be had to the following detailed description taken in connection with the accompanying drawing, wherein:

Figures 3, 4:
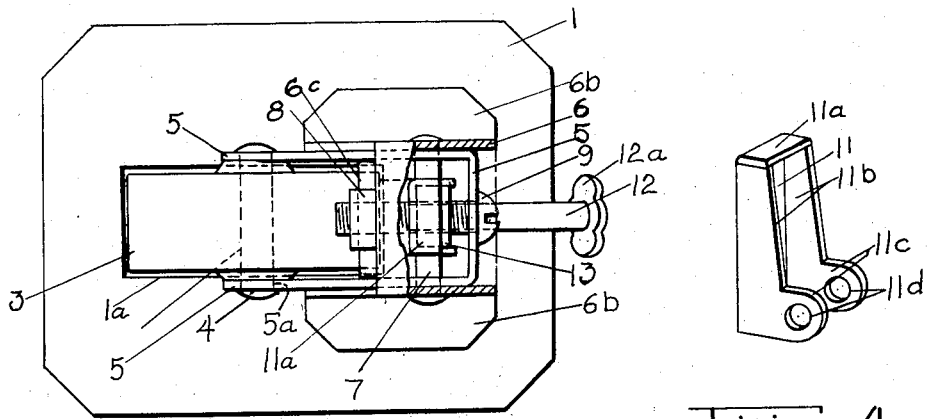
Fig. 3 is a top plan view of said unit, with a part of the stationary housing broken away.
Fig. 4 is a perspective view of the brake shoe.

Referring to the drawing, 1 represents a flat gusset plate adapted to be secured within the bottom of an appliance cabinet, of which a fragment 2 is shown. The plate contains a large opening 1a near one end. A housing 6 is fixed to and rises up from said plate near the other end. The housing is preferably a plate bent into an inverted U shape, with small holes 6a in the arms and with the free ends of the arms bent laterally, as at 6b, to provide feet resting on and welded to the gusset plate. The cross piece of the U is extended and bent down to form a depending, vertical flange terminating in an outwardly protruding lip 6c. The vertical part of this flange contains a hole 6d.

Within the housing is a holder 5 that comprises a plate provided with two wings. This member is hingedly connected to the housing by a pin 7 that extends through the wings and through the holes 6a in the housing; the wings extending out over the large opening 1a in the gusset plate. Between the wings is a roller 3 rotatable on a stationary pin or shaft 4 that passes through the roller and through holes 5a in the wings; the ends of the pin being headed over to keep the pin in place. The approximately upright part of the roller holder extends upwardly behind and in overlapping relation to flange 6c, and is there provided with a hole 5b. Below hole 5b is a lip or flange 5c, on the same side of the upright part of the holder as the wings. There is another hole, 5d, in said upright part between hole 5b and flange 5c. On the lip forming part of flange 6c rests a nut 8. A headed screw 9 extends through hole 5b in the roller holder, through hole 6d in the housing and into said nut. Therefore the angle through which the roller may rock is determined by the adjustment of this screw. In order that said holder may always be yieldingly held in or be urged toward one limit of its movements, there is provided a spring which may conveniently comprise a U-shaped spring wire 10, resting at the closed end 10a on the gusset plate and having its arms extending up in contact with and past hinge pin 7. The arms of the U are so bent and the parts are so proportioned that the spring tends constantly to hold the upright element of the roller holder against the head of screw 9.

Nested within roller holder 5 is a brake shoe 11. Hinge pin 7 passes through holes 11d in ears 11c on the shoe and serves as the hinge pin for the shoe. The shoe extends up almost to screw 9 and has at the top a flange 11a facing said upright part of the holder at a somewhat higher level than flange 5c. Fitting between these two flanges and between flanges 11b along the sides of the shoe is a nut 13. A long screw 12, provided with a large head or handhold 12a, passes through hole 5d and through nut 13 into engagement with the brake shoe.

When the unit is installed in a cabinet, gusset plate 1 may underlie and be welded to inturned flanges 2c on meeting vertical walls 2 of which one is shown; this latter wall being parallel to the hinge and roller axes and being provided with a small hole 2b in line with screw 9 and with a vertically elongated hole 2a through which screw 12 projects to the exterior of the cabinet.

Screw 9 is preferably horizontal so that a screw driver, entering hole 2b at right angles to wall 2, may easily be engaged with the screw. Screw 12 may be downwardly inclined so as to be at right angles to the brake shoe.

Figures 1, 2:
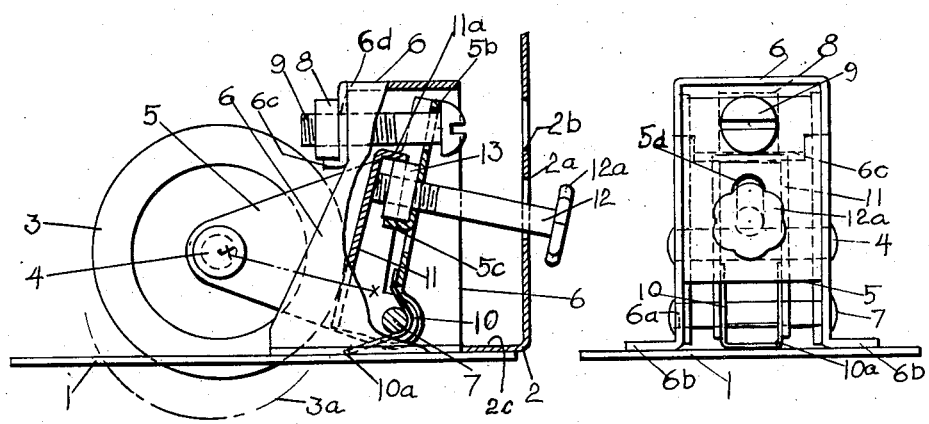
Fig. 1 is a view, partly in side elevation and partly in section, of a unit embodying a preferred form of the invention, together with a fragment of a cabinet to which the unit has been applied.
Fig. 2 is a front elevational view of said unit.

In Fig. 1 of the drawing the roller is shown in full lines projecting only slightly below the gusset plate, the spring holding it up. Upon turning screw 9 farther into nut the holder is rocked in the counter clockwise direction, causing the roller to be lowered; broken line 3a indicating the lowermost position which may be assumed by the roller.

The brake shoe shifts with the roller holder since both have the same hinge axis and screw 12 is mounted on the holder. Therefore the raising and lowering of the roller does not affect the relation between the same and the brake shoe.

Since the brake serves primarily to hold an appliance temporarily, perhaps, in a selected position, it is desirable that it be easy to operate, while exerting a strong braking force. In the arrangement shown in Fig. 1, line x—x is a radius, extended, of the roller passing through the point of contact of the shoe with the roller. It will be seen that this point is quite near a plane containing both the roller axis and the hinge axis. Screw 12, on the other hand, is far above such plane and therefore transmits force to the long arm of a lever, so that this force is greatly multiplied before it is transmitted to the shoe. Also, the force delivered to the lever has been transformed by the screw into a much greater force than that supplied by the person operating the screw. Therefore little effort is needed to operate the screw and, actually, women and children can apply and release the brake by simply taking a light finger grip on the screw.

It will be noted that nut 13 is held in its seat independently of screw 12; screw 9 serving as a tie to prevent the brake shoe and the upright part of the roller holder from spreading apart far enough to allow the nut to drop out. For that reason a cabinet needs only a narrow slot 2a for the passage of the screw, and not a hole large enough to permit the screw head to pass through the same. In other words, screw 12 may be detached before the unit is secured within the cabinet and then be inserted again after the unit has been been secured in its position of final use.

While I have illustrated and described with particularity only a preferred form of my invention, I do not desire to be limited to the exact details so illustrated and described; but intend to cover all forms and arrangements that come within the definitions of the invention constituting the appended claims.

I claim:

1. In combination, a support, a holder and a brake shoe mounted on the support for swinging movements about a common hinge axis, a roller mounted in the holder for rotation about an axis parallel to and remote from the hinge axis, the shoe engaging the roller close to the hinged end of the shoe, means on the support to limit the swinging movements of the holder to a selected small angle, and means on the holder cooperating with said shoe at a point near the free end of the shoe to press the shoe against the roller.

2. A combination as set forth in claim 1 wherein the means for limiting the movements of the holder comprises an upright on the support provided with a stop to be engaged by the holder at one limit, together with an adjustable tie between the stop and the holder to prevent the latter from swinging past its other limit but leaving it free to move from one limit to the other.

3. A combination as set forth in claim 1, wherein the means to press the shoe against the roller consists of a screw and a nut, the holder and the shoe being provided with lips to support the nut in the space between them and to prevent the nut from turning, and the holder being provided with an opening through which the screw passes into the nut and through the nut into engagement with the shoe.

4. In combination, a horizontal gusset plate, a housing on and rising above the same, a holder and a brake shoe mounted in the housing for up and down swinging movements about a common hinge axis near said plate, a roller mounted on the holder for rotation about an axis parallel to and remote from the hinge axis, adjustable means at the top of the housing to limit the swinging movements of the holder to small angles, and means on the holder to press the brake shoe against the roller.

5. A combination as set forth in claim 4, wherein the gusset plate is provided with an opening through which the roller extends.

6. A combination as set forth in claim 4, wherein the means at the top of the housing comprises a down-turned flange on the side toward the roller, and out-turned lip on said flange, a nut resting on said lip, and a headed screw passing loosely through the holder and then through the flange and into the nut.

7. A combination as set forth in claim 4, wherein the brake shoe comprises a plate having at both sides and at the top flanges facing away from the roller, and the holder has on the side facing the shoe a lip below the top flange on the shoe; and wherein the means for pressing the shoe against the roller consists of a nut fitting between said top flange and said lip, together with a screw extending through the holder and the nut and bearing against the brake shoe.

8. In combination, a support, a member hinged at one end to said support for up and down swinging movements, a roller mounted on the other end of said member for rotation about an axis parallel to and remote from the hinge axis of said member, an element extending upwardly from said member, means on the support including a screw device extending freely through the upper end of said element to permit said member to rock through a small angle, a brake shoe mounted between the roller and said element to swing about the same axis as the said member, said shoe contacting the roller at the end of a radius of the roller which, extended, passes close to the hinge axis, and means mounted on said element to exert pressure against the upper end of the shoe in the direction to press the shoe against the roller.

9. In combination, a support, a holder and a brake shoe mounted on the support for swinging movements about a common hinge axis, a roller mounted on the holder for rotation about an axis parallel to and remote from the hinge axis, means on the support to limit the swinging movements of the holder to a selected angle, a nut positioned between upright portions of the holder and the shoe at a point remote from the hinge axis, and elements on the holder and the shoe engaging the nut to keep it in its working position, and a detachable screw extending through said holder element and into and through the nut to contact said shoe element and press the shoe against the roller.

10. In combination, a horizontal support, a member overlying and hinged at one end to said support for vertical swinging movements, a roller mounted on the other end of said member for rotation about an axis parallel to the hinge axis of said member, an element extending up from the hinged end of said member, a housing on the support extending over said element and the adjacent end of said member, a screw device extending through a part of the housing and through the upper end of said element to permit said member to rock through a small angle, a brake shoe mounted in the housing between said element and the roller to swing about the same axis as said member, said shoe contacting the roller near the lower end of the shoe, and means mounted on said element to exert pressure against the upper end of the shoe in the direction to press the shoe against the roller.

11. A combination as set forth in claim 10, wherein the last-mentioned means includes a nut between the shoe and the upwardly extending element, lips on the shoe and said element loosely engaging the nut and preventing it from turning, and a screw extending loosely through said element and through the nut in contact with the shoe.

References Cited in the file of this patent

UNITED STATES PATENTS

| 1,835,144 | Cleaveland | Dec. 8, 1931 |
| 2,320,407 | Campbell | June 1, 1943 |
| 2,772,839 | Morton | Dec. 4, 1956 |
| 2,775,313 | Kurvers | Dec. 25, 1956 |